(12) United States Patent
Buerkle et al.

(10) Patent No.: US 6,298,091 B1
(45) Date of Patent: *Oct. 2, 2001

(54) METHOD TO PLAY AUDIO AND VIDEO CLIPS THROUGH MPEG DECODERS

(75) Inventors: Daniel J. Buerkle, Newark Valley; Bryan J. Lloyd, Johnson City; Ronald S. Svec, Berkshire, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,283

(22) Filed: Mar. 23, 1998

(51) Int. Cl.$^7$ .................................................. H04B 14/04
(52) U.S. Cl. ............................................. 375/253; 375/246
(58) Field of Search ................................... 375/242, 246, 375/253; 386/111, 112; 341/63, 65, 67; 382/233; 708/203; 709/247; 710/68

(56) References Cited

U.S. PATENT DOCUMENTS

| | | | |
|---|---|---|---|
| 4,885,632 | * 12/1989 | Mabey et al. | 348/13 |
| 5,835,033 | * 11/1998 | Mita | 341/63 |
| 5,933,536 | * 8/1999 | Fukuzawa | 382/246 |

* cited by examiner

*Primary Examiner*—Chi Pham
*Assistant Examiner*—Phuong Phu
(74) *Attorney, Agent, or Firm*—Scully, Scott, Murphy & Presser; William H. Steinberg

(57) ABSTRACT

A method and system of operating a digital data decoder. In accordance with this method, a first stream of encoded data is transmitted to the decoder, and a second stream of encoded data is stored in a memory device. One of the first and second streams of encoded data is selected, and the decoder is used to decode that selected stream of encoded data. This second stream of data could have been placed in the memory device by other devices or processes present in an STB system. In this case, all the decoder needs to process the data is a pointer to it and some additional information about, for example, its size. Since the processor has access to all memory, it can do any necessary parsing/manipulation required by the stream format. This provides a large degree of flexibility in this area. The processor can then pass location and attributes of data to the decoder. This also minimizes data movement to/from memory, reducing bandwidth requirements.

8 Claims, 3 Drawing Sheets

METHOD TO PLAY AUDIO AND VIDEO CLIPS THROUGH MPEG DECODERS

BACKGROUND OF THE INVENTION

This invention relates generally to the digital data decoding systems, and more particularly, to the use of such systems with compressed input from various sources beyond a base network connection.

Full motion video displays based upon digital video signals are becoming more widely available. While these displays have many advantages, they also often require massive amount of raw digital data. The transmission of these massive amounts of video information is often impractical or infeasible. For this reason, digital video signals are often compressed before being transmitted.

Various video compression standards or processes have been established, including MPEG-1 and MPEG-2. These conventional video compression techniques utilize similarities between successive image frames, referred to as temporal or interframe correlation, to provide interframe compression in which pixel based representations of image frames are converted to motion representations. In addition, the conventional video compression techniques use similarities within image frames, referred to as spatial or intraframe correlation, to provide intraframe compression in which the motion representations within an image frame are further compressed.

After the video data is compressed, or encoded, it is transmitted to a decoder that decodes, or decompresses, the compressed data to reconstruct the original video data. That data may then be shown on a video display device, such as a conventional television. Decoders that are used with television sets are often referred to as set-top box (STB) systems.

Stand-alone audio/video decoders currently used in set-top box systems generally utilize a dedicated interface to a specific transport chip and/or network interface module (NIM). As the required utility of these STB systems expands, it is becoming desirable to adopt compressed input from various sources in addition to the base network (cable/satellite) connection. These additional sources could be, for example, a local digital video disc (DVD) player or an internet connection. Oftentimes, this is accomplished by providing a feedthrough path from the application processor in this same interface, allowing the processor to directly load this data. However, this method has the possibility of being relatively slow and may require a significant portion of the processor bandwidth.

As the integration of audio/video decoders and other components of STB systems onto common silicon progresses, new options become viable. Integration allows greater flexibility in the interconnection of functional units and access to memory, such as a common memory subsystem architecture.

SUMMARY OF THE INVENTION

An object of this invention is to play audio and video clips through MPEG decoders.

Another object of the present invention is to use a digital data decoder to play short segments of video that are not received directly from the normal cable/satellite network.

These and other objectives are attained with a method and system of operating a digital data decoder. In accordance with this method, generally, a first stream of encoded data is transmitted to the decoder, and a second stream of encoded data is stored in a memory device. One of the first and second streams of encoded data is selected, and the decoder is used to decode that selected stream of encoded data.

This second stream of data could have been placed in the memory device by other devices or processes present in an STB system. In this case, all the decoder needs to process the data is a pointer to it and some additional information about, for example, its size. Since the processor has access to all memory, it can do any necessary parsing/manipulation required by the stream format. This provides a large degree of flexibility in this area. The processor can then pass location and attributes of data to the decoder. This also minimizes data movement to/from memory, reducing bandwidth requirements.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
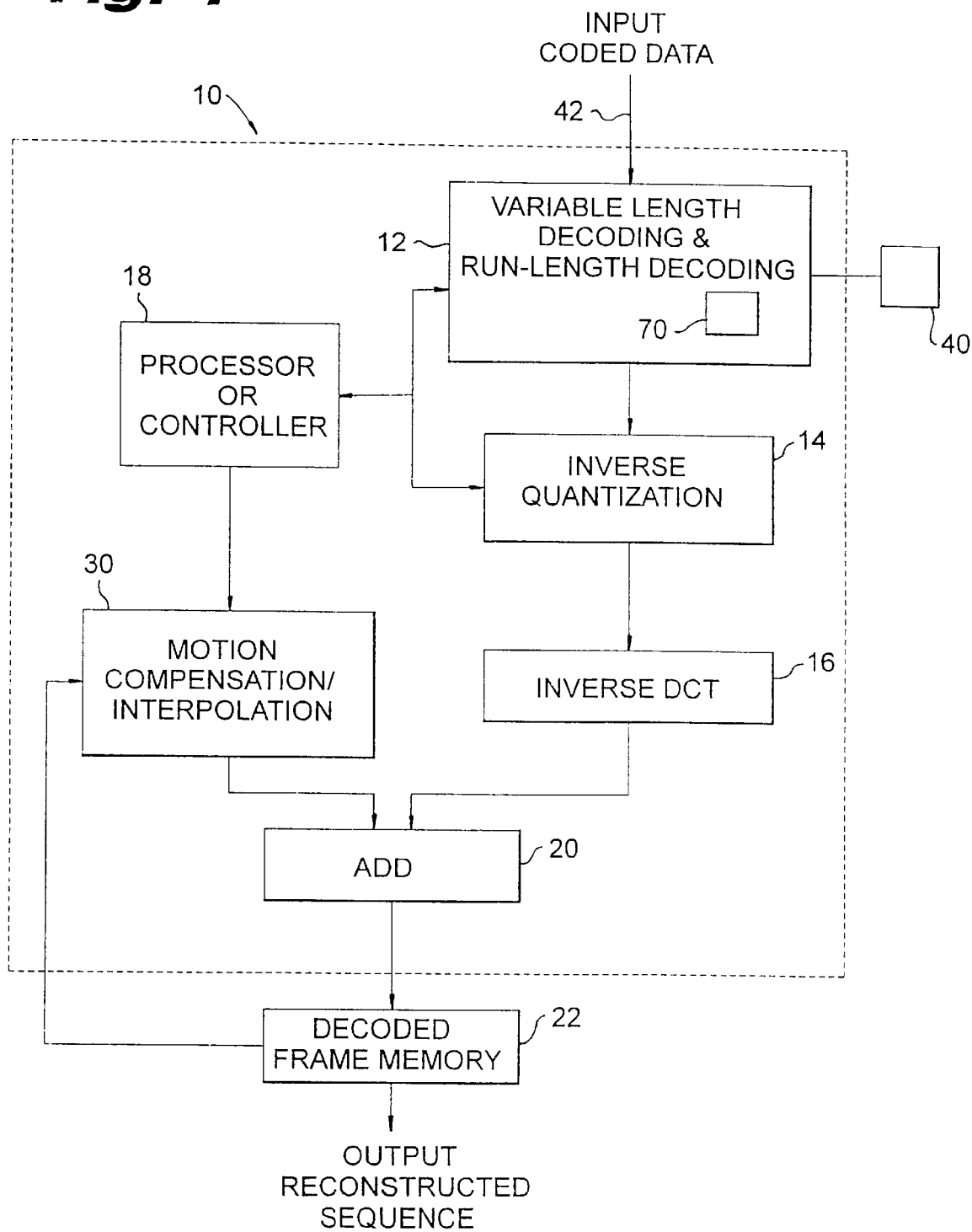
FIG. 1 shows a video signal decoding apparatus.

FIG. 1 shows a video or audio signal decoding apparatus 10. In this apparatus, input coded information, which is the encoded video bit stream transmitted from an encoder, is inputted to a variable length decoding and run-length decoding circuit 12. Circuit 12 demultiplexes and decodes the variable length codes to produce the quantized coefficients of each block of the coded frame and the side information of the block, i.e, the motion vector, the quantization step and the information bit indicating whether the block is motion compensated or not. The variable length decoding and run-length decoding circuit 12 also checks the frame number of the frame to be decoded to determine whether the frame is intra-coded or predictive coded.

The decoded quantized coefficient block is transmitted to an inverse quantization circuit 14, which performs an inverse quantization process, and the output of circuit 14 is sent to an inverse discrete cosine transform (inverse DCT) circuit 16, which performs an inverse discrete cosine transformation (inverse DCT) process. The output of the inverse DCT circuit, which is a sequence of blocks of pixel data, is applied to a an adder. In addition, the side information obtained in the variable length decoding & run-length decoding circuit 12 is transmitted to the processor/controller circuit 18.

The processor 18 checks the frame number and, if the frame to be decoded is an intra-coded frame, the output of the motion compensation circuit 30 is controlled such that IDCT 16 output only is sent to a decoded frame memory 22. The data stored in the memory 22 is then outputted as an output reconstructed sequence. This output sequence is also saved in decoded frame memory 22 for motion compensation of the next frame.

If the information transmitted to processor 18 indicates a predictive-coded frame, then the processor checks an information bit indicating whether or not a block is coded with motion compensation. If the block outputted from the inverse DCT circuit 16 is coded without motion compensation, then the processor causes the block to be sent directly to the decoded frame memory 22 as described above. The data stored in the frame memory 22 is then outputted as an output reconstructed sequence, and is also saved for motion compensation of the next frame.

If the block outputted from the inverse DCT circuit 16 is a predictive-coded frame and is coded with motion compensation, then this block is a differential block. In this case, a predicted block is obtained through an interpolation/ motion compensation process performed in a motion compensation circuit 30. To do this, the processor causes the output of the IDCT 16 to be added to the output of motion compensation 30 in adder 20. The motion vector obtained in the variable length decoding & run-length decoding circuit 12 is transmitted to the motion comp unit 30.

The motion comp unit 30 performs an interpolation process using the data from the decoded frame memory 22 to obtain the predicted block. The adder 20 adds the difference block to the predicted block outputted from the motion comp 30 to produce a reconstructed block. This reconstructed block is transmitted to the decoded frame memory 22. The reconstructed blocks of the frame stored in the decoded frame memory are outputted as the output reconstructed sequence and also saved for later use.

The video or audio decoder 10 is provided with the ability to decode bitstreams already loaded in memory. These bitstreams are not delivered to the decoder via the normal path 42 from the transport macro, but instead are read directly from memory 40. This feature allows the decoder 10 to play short segments of video that were not received directly from the normal cable/satellite network. As an extension, this method could also be used to handle continuous streams through the decoders, such as from a DVD player. Reading a bitstream directly from memory reduces the memory bandwidth requirements. This is because data from the transport is first written to the rate buffer in memory, and then retrieved at decode time. Whereas when playing a video clip, the bitstream is read from memory at decode time, eliminating the write operation into the rate buffer. Reading the bitstream in this way is an implementation dependent feature.

Figure 2:
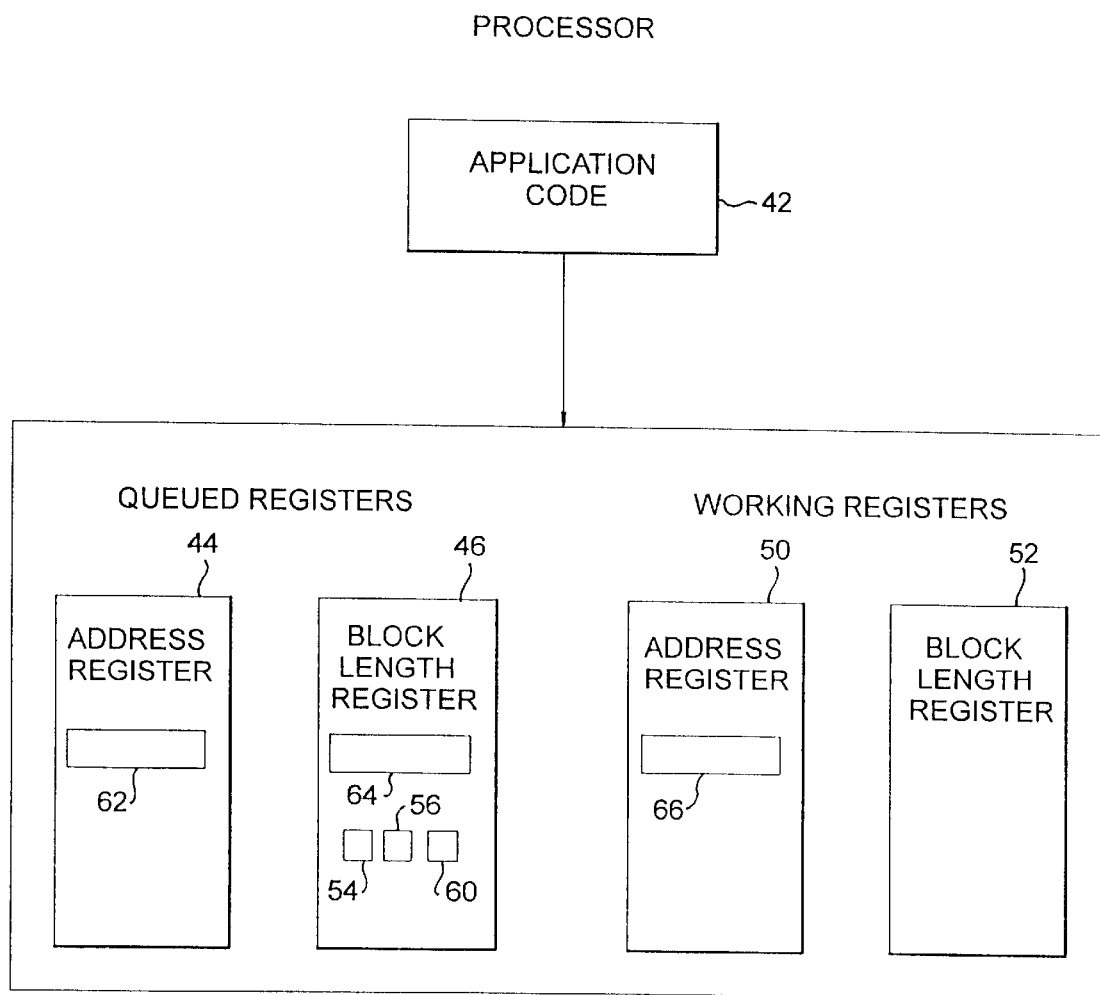
FIG. 2 depicts various registers that are used to enable the apparatus of FIG. 1 to decode prestored video or audio data.

With reference to FIG. 2, two sets of registers are used to allow the application code, running on a processor 42, to drive the decoding of video clips in the decoder. The first set of registers 44, 46 are referred to as "Queued" registers, and these registers are read/write accessible and provide the path for the application code to drive the process. The second set of registers 50, 52 are the Working registers, which are read only, and provide information as to what the decoder hardware is currently doing. Each register set contains two registers, an address register and a block length register. The Queued length register also contains various flag/control bits, including a Block Valid bit 54, an End of Stream bit 56, and a Stream Busy bit 60.

More specifically, the Queued Address register 44 contains an address 62 specifying the memory location from which the bitstream is to be read. This is a byte address, which allows the greatest flexibility in placement of the clip data without requiring extra data movement to provide halfword or word alignment. This register can be read and written by the application code. The Queued Length register 46 contains a value, schematically represented at 64, indicating the number of data bytes in this block or portion of the bitstream.

The Block Valid bit 54 is contained in the Queued Length register 46. This bit signifies that the values in the Queued Address, Queued Length, and End-of-Stream registers/flags are valid and may be used by the decoder hardware for processing the bitstream. Once the Block Valid bit is set, and if the decoder hardware is not currently processing a bitstream (active working registers), the following process occurs. First, the contents of the Queued Address and Queued Length registers are copied into the Working Address and Working Length registers 50, 52. Next, the decoder begins processing the new block specified by the working registers. After this, the Block Valid bit 54 in the Queued Length register is cleared, indicating that the application code can update them for the next block; and the Stream Busy bit in the Queued Length register is set, indicating that the decoder is processing the bitstream. Preferably, this latter is read-only.

If the Block Valid bit is set while the decoder is already busy processing data, preferably the above steps do not occur, and the data is held in the queued registers. Also, preferably, the application code refrains from making further updates to the Queued Address and Queued Length registers while the Block Valid bit is active. When the decoder completes processing of the current working block, the queued register's information is moved into the working register as outlined above.

The End Of Stream (EOS) flag or bit 60 is contained in the Queued Length register, and this flag signifies that the bitstream being decoded ends at the end of this block. This signals the decoder that no further bitstream data will be present, and that decoding should proceed through the end of this block. EOS is another implementation dependent feature, not necessary in the general case.

The Working Address register 50 contains an address 66 specifying the memory location from which the bitstream is currently being read. In the preferred embodiment, this register is only read by the application code.

The Stream Busy bit 60 is contained in the Queued Length register 46. Even though this bit provides the status for the working block/register, the bit is included in the queued registers to allow the application code to read all status bits simultaneously. This bit signifies that the decoder is in the process of decoding bitstream data from the block specified by the set of working registers, and once the last data is read for this block, this bit is cleared. This action may also causes a Block Read Complete interrupt to be generated to the processor.

The operation of the Stream Busy and Block Valid bits are closely tied together to ensure that the application code obtains a clear picture of the hardware status when they are interrogated. The hardware cannot clear the Block Valid bit until the Stream Busy bit is again active after the Queued registers are transferred to the Working registers. The application code may use the conditions where both bits are zero to indicate an underrun of the stream. Preferably, the case where the Block Valid bit is on, but the Stream Busy bit is off is avoided, if possible, since this indicates that the decoder is not processing a block even though there is a valid block specified in the queued registers.

With the preferred embodiment of the invention, a Clip Mode bit, schematically represented at 70 in FIG. 1, is defined in the Decoder Control register. This bit determines the source from which the decoder, more specifically the VLD unit 12, takes bitstreams. In particular, on the basis of this bit, the decoder selects either the transport/rate buffer-sourced bitstreams, or the clip-mode sourced bitstreams.

Figure 3:
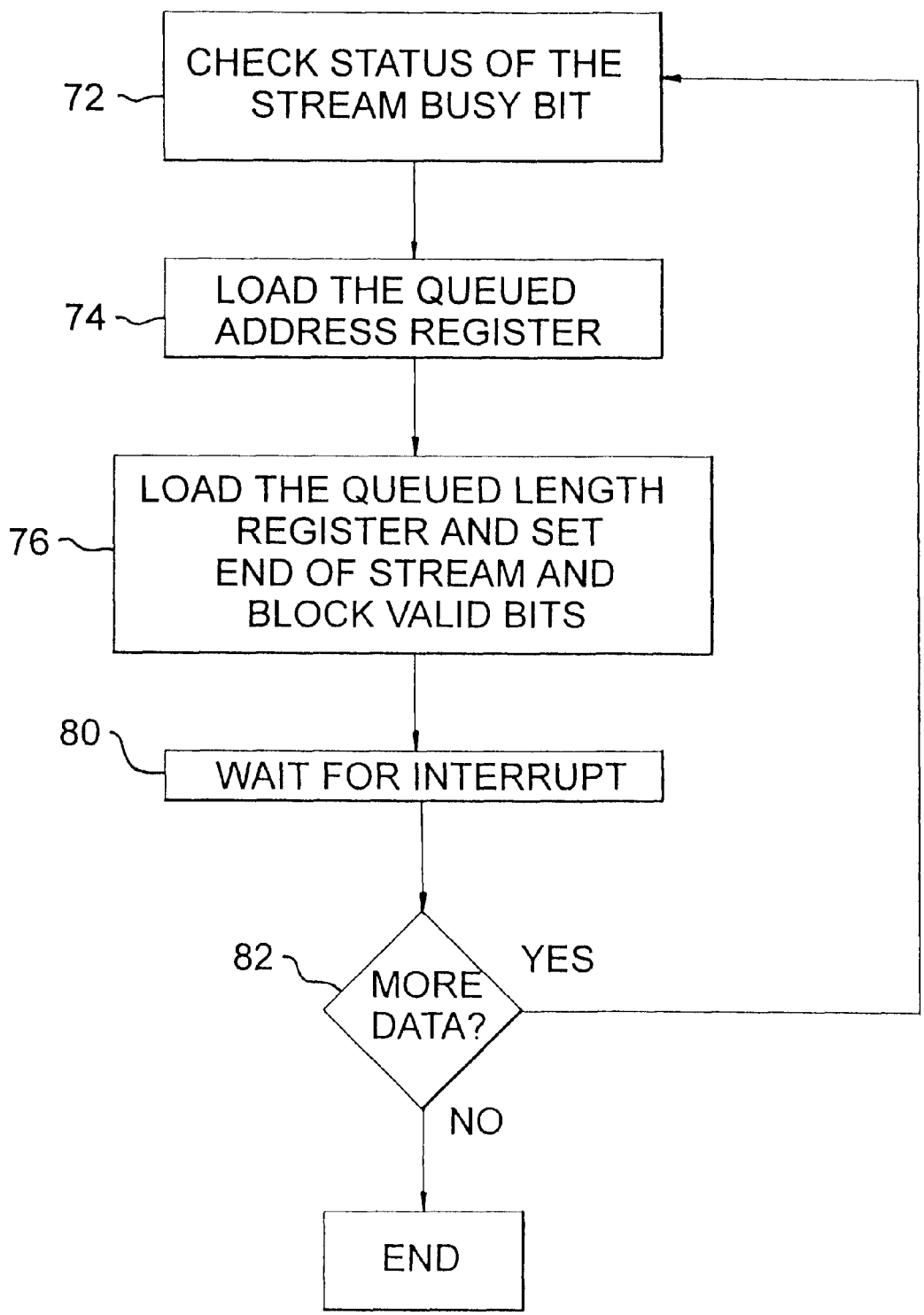
FIG. 3 is a flow chart illustrating one procedure for using the registers shown in FIG. 2 to process a compressed clip bitstream.

FIG. 3 illustrate a procedure that may be used by the application code to manipulate the above-described registers to process a compressed clip bitstream subsequent to the mode switch. At step 72, processor 42 check the status of the stream busy bit, and the routine waits at this step until that bit indicates that queued registers are available. Once the stream busy bit is clear, the routine proceeds to step 74 and the Queued address register is loaded with the starting address of a data block. Then, at step 76, the Queued Length register is loaded with the number of bytes in the block of bitstream data, and the Block Valid bits are appropriately set. After this, as represented by step 80, the process pauses and checks to determine if it has received the Block Read Complete interrupt. When that interrupt is received, the routine checks to see if more data 82 needs to be processed, and if so the routine returns to step 72. Steps 72, 74, 76 and 80 are repeated until no more data needs to be processed; and when this happens, the routine ends.

Alternatively, the check for interrupt step need not be executed, in which case the condition of the stream busy bit 60 as checked at step 72 will satisfactorily control the operation. This provides flexibility for application code to operate as interrupt drives or polling drives, per other system requirements/standards.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method of operating a digital data decoder, comprising the steps of:
    transmitting to the decoder a first stream of encoded MPEG digital video or audio data from a remote base network;
    storing a second stream of encoded MPEG digital video or audio data in a memory device;
    identifying in a set of registers starting locations and lengths of data blocks in the memory device;
    selecting, under control of a processor, at respective times the first and second streams of encoded data for processing by the decoder;
    when the second stream of data is selected, transmitting to the decoder blocks of data from the memory device starting at the identified starting locations and continuing on for the identified lengths; and
    using the decoder to decode the selected stream of encoded data.

2. A method according to claim 1, wherein:
    the storing step includes the step of storing the second stream of encoded data in a given area of the memory device, said given area having a starting address and a set length;
    the identifying step includes the steps of
       i) using the processor to identify said starting address in the register set, and
       ii) using the processor to identify said set length in the register set, and
    the transmitting step includes the step of sending to the decoder a length of data equal to said set length and starting from said starting address.

3. A method according to claim 1, wherein:
    the second stream of data includes a multitude of blocks of data, each of said blocks having a respective set length and a respective starting address in the memory device; and
    the identifying step includes the steps of
       i) using the processor to store the starting addresses of said blocks in a first register set,
       ii) using the processor to store the set lengths of said blocks in the first register set,
       iii) transmitting said sting addresses, one at a time, from the first register set to a second register set, and
       iv) each time the starting address of one of the blocks is transmitted from the first register set to the second register set, also transmitting the set length of said one of the blocks from the first register set to the second register set.

4. A method according to claim 3, wherein:
    the step of transmitting to the decoder includes the step of sending to
    the decoder a length of data equal to the set length identified in the second register set, and starting from the starting address identified in the second register set;
    setting a busy bit when a starting address is transmitted from the first register set to the second register set; and
    clearing the busy bit when the block of data identified by the starting address identified in the second register set has been completely sent to the decoder.

5. A digital data decoding system, comprising:
    means for receiving a first stream of encoded data from a remote base network;
    a local memory device for storing a second stream of encoded data;
    a set of registers for identifying starting locations and lengths of data blocks in the memory device;
    a decoder to decode the first and second streams of encoded data;
    a processor for controlling selecting at respective times the first and second streams of encoded data for decoding by the decoder; and
    means for transmitting to the decoder, when the second stream of data is selected, blocks of data from the memory device starting at the identified locations and continuing on for the identified lengths.

6. A system according to claim 5, wherein:
    the second stream of encoded data is stored in a given area of local memory device, said given area having a starting address and a set length;
    the processor includes
       i) means to identify said starting address in the register set,
       ii) means to identify said set length in the register set
    the transmitting means includes means to send to the decoder a length of data equal to said set length and starting from said starting address.

7. A system according to claim 5, wherein:
    the second stream of data includes a multitude of blocks of data, each of said blocks having a respective set length and a respective starting address in the storing means;
    the set of registers includes
       i) a first register set storing the starting addresses and the set lengths of said blocks,
       ii) a second register set,
       iii) means for transmitting said starting addresses, one at a time, from the first register set to a second register set; and each time the starting address of one of the blocks is transmitted from the first register set to the second register set, also transmitting the set length of said one of the blocks from the first register set to the second register set.

8. A system according to claim 7, wherein the transmitting means includes:

means for sending to the decoder a length of data equal to the set length identified in the second register set, and starting from the starting address identified in the second register set; and the system further includes means for setting a busy bit when a sag address is transmitted from the first register set to the second register set, and for clearing the busy bit when the block of data identified by the starting address identified in the second register set has been completely sent to the decoder.

* * * * *

UNITED STATES PATENT AND TRADEMARK OFFICE
CERTIFICATE OF CORRECTION

PATENT NO. : 6,298,091 B1
DATED : October 2, 2001
INVENTOR(S) : Daniell J. Buerkle et al.

It is certified that error appears in the above-identified patent and that said Letters Patent is hereby corrected as shown below:

<u>Column 6,</u>
Line 6, "sting" should read -- starting --

<u>Column 8,</u>
Line 1, "sag" should read -- starting --

Signed and Sealed this

Twenty-fourth Day of September, 2002

Attest:

Attesting Officer

JAMES E. ROGAN
Director of the United States Patent and Trademark Office